(12) United States Patent
Alsharaeh et al.

(10) Patent No.: US 10,566,145 B2
(45) Date of Patent: Feb. 18, 2020

(54) TIO$_2$-GRAPHENE-SILVER HYBRID NANOCOMPOSITE AND A METHOD OF PREPARATION THEREOF

(71) Applicant: The King Abdulaziz City for Science and Technology, Riyadh (SA)

(72) Inventors: Edreese Hosni Alsharaeh, Riyadh (SA); Abdelrahman Ibrahim Soliman, Riyadh (SA); Khalid Mustafa Abu-Salah, Riyadh (SA); Sulaiman Mohammed Alfadul, Riyadh (SA)

(73) Assignee: KING ABDULAZIZ CITY FOR SCIENCE AND TECHNOLOGY—KACST, Riyadh (SA)

( * ) Notice: Subject to any disclaimer, the term of this patent is extended or adjusted under 35 U.S.C. 154(b) by 0 days.

(21) Appl. No.: 15/462,800

(22) Filed: Mar. 18, 2017

(65) Prior Publication Data

US 2019/0311861 A1 Oct. 10, 2019

(51) Int. Cl.
*H01G 11/42* (2013.01)
*B01J 19/12* (2006.01)
(Continued)

(52) U.S. Cl.
CPC .......... *H01G 11/42* (2013.01); *B01J 19/126* (2013.01); *H01G 11/36* (2013.01); *H01G 11/46* (2013.01);
(Continued)

(58) Field of Classification Search
CPC ...... H01L 33/343; H01M 4/364; A01N 59/16; B01J 20/30; B01D 69/141
(Continued)

(56) References Cited

U.S. PATENT DOCUMENTS

| 9,768,355 B2* | 9/2017 | El-Shall | B82Y 30/00 |
| 2017/0087519 A1* | 3/2017 | Fortner | B01D 69/141 |

FOREIGN PATENT DOCUMENTS

| CN | 105170132 | * 12/2015 | B01J 20/30 |
| WO | WO 2016/095358 | * 6/2016 | A01N 59/16 |

OTHER PUBLICATIONS

Wen et al., "Preparation and visible light photocatalytic activity of Ag/TiO2/graphene nanocomposite", Nanoscale, Mar. 2011, 4411-4417.*

* cited by examiner

*Primary Examiner* — Khanh T Nguyen
(74) *Attorney, Agent, or Firm* — Steven M. Shape; Dennemeyer & Associates, LLC

(57) ABSTRACT

A TiO$_2$-graphene-silver hybrid nanocomposite and a method of preparing the TiO$_2$-graphene-silver hybrid nanocomposite is disclosed. The TiO$_2$-graphene-silver hybrid nanocomposite at an average particle size ranging from 12-15 nanometers and having a surface area of 140.5 m$^2$/g includes titanium oxide, graphene oxide and silver, the silver ranging from about 2 weight % to 10 weight %. The method of preparation includes introducing sol gel to a microwave irradiation to prepare an irradiated sample of TiO$_2$-graphene oxide sample, wherein the sol gel includes TiO$_2$ containing gel along with graphene containing sol, followed by adding AgNO$_3$ solution to the TiO$_2$-graphene oxide sample for preparing a TiO$_2$-graphene-silver hybrid suspension. The TiO$_2$-graphene-silver hybrid suspension undergoes microwave irradiation to prepare dried TiO$_2$-graphene-silver hybrid composite.

10 Claims, 10 Drawing Sheets

(51) Int. Cl.
*H01G 11/36* (2013.01)
*H01G 11/46* (2013.01)
*B82Y 30/00* (2011.01)
*B82Y 40/00* (2011.01)

(52) U.S. Cl.
CPC .. *B01J 2219/089* (2013.01); *B01J 2219/1206* (2013.01); *B82Y 30/00* (2013.01); *B82Y 40/00* (2013.01)

(58) Field of Classification Search
USPC .......................................... 252/500; 430/322
See application file for complete search history.

0
TIO$_2$-GRAPHENE-SILVER HYBRID NANOCOMPOSITE AND A METHOD OF PREPARATION THEREOF

FIELD OF INVENTION

The present invention generally relates to the field of hybrid nanocomposites for energy storage applications. More specifically, the present invention relates to TiO$_2$-graphene-silver hybrid nanocomposite employed in a supercapacitor among many energy storage applications and a method of preparation thereof.

BACKGROUND OF INVENTION

Drastic climatic changes and urbanization has shifted focus to primarily energy needs, especially in the scientific and industrial communities. The erstwhile non-renewable energy resources contribute to environment pollution, increasing mining cost, depletion of fossil fuel, etc. While titanium oxide (TiO$_2$) is being explored and researched as a promising candidate for supercapacitors, especially in terms of energy storage applications, owing to its characteristics like low cost, natural abundance, renewable in nature, etc. to name a few, optimum efficiency levels had not been met with mere titanium oxide (TiO$_2$).

Therefore, there exists a need for improvised and economic renewable energy sources with enhanced energy density, wherein enhanced energy performance may be characterized by voltage limit, specific capacitance, energy density, power density, life time and likewise.

BRIEF DESCRIPTION OF THE FIGURES

The accompanying figures wherein like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1A:
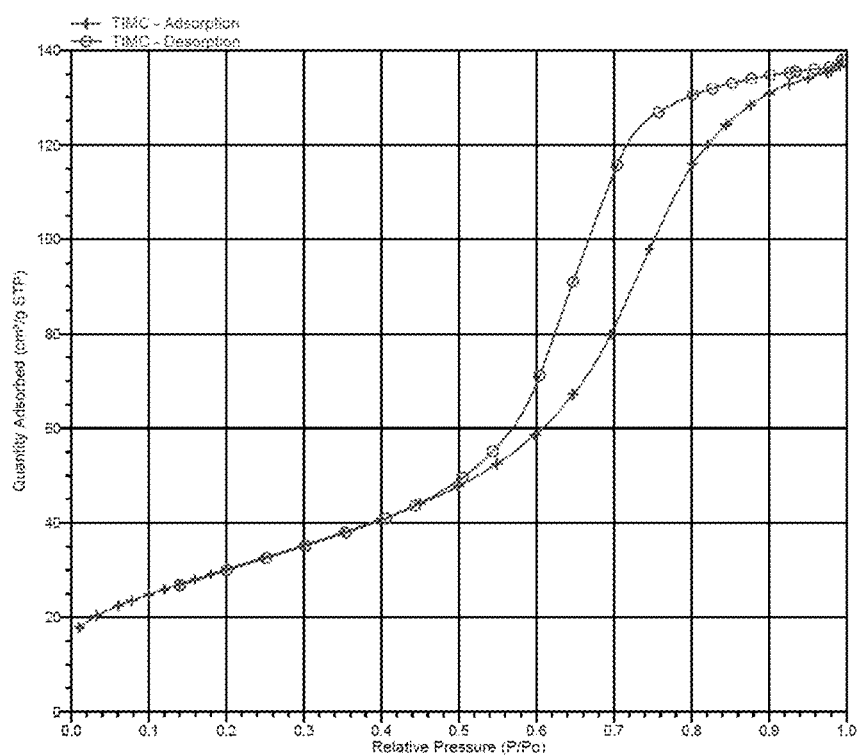
FIG. 1a is illustrative of adsorption-desorption isotherms of TiO$_2$ particles using surface area analyzer (physical adsorption-desorption of N$_2$ at liquid-N$_2$ temperature) exhibiting a typical IV hysteresis loop.
Figure 1:
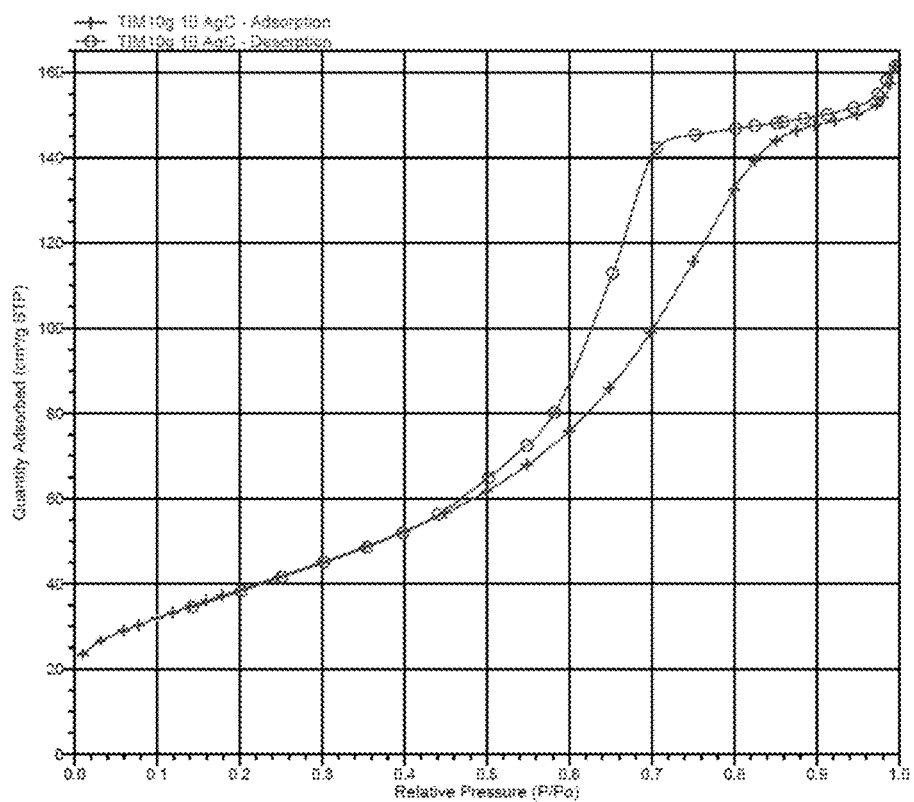
FIG. 1b is illustrative of adsorption-desorption isotherms of TiO$_2$-graphene-silver, wherein the percentage weight of silver in the hybrid nanocomposite is 10%.

Before describing in detail embodiments that are in accordance with the present invention, it should be observed that the embodiments reside primarily in a TiO$_2$-graphene-silver hybrid nanocomposite and method of preparation thereof. Accordingly, the method steps and nanocomposite components have been represented where appropriate by conventional symbols in the drawings, showing only those specific details that are pertinent to understanding the embodiments of the present application so as not to obscure the disclosure with details that will be readily apparent to those of ordinary skill in the art having the benefit of the description herein.

In this document, the terms "comprises," "comprising," or any other variation thereof, are intended to cover a non-exclusive inclusion, such that a process, method, article, or apparatus that comprises a list of objects may include not only those objects but also include other objects not expressly listed or inherent to such process, method, article, or apparatus. An object proceeded by "comprises . . . a" does not, without more constraints, preclude the existence of additional identical objects in the process, method, article, or apparatus that comprises the object.

Embodiments of the present invention provide a TiO$_2$-graphene-silver hybrid nanocomposite and a method of preparation thereof.

In accordance with the present invention, a TiO$_2$-graphene-silver hybrid nanocomposite includes titanium oxide ranging from about 70 weight % to 98 weight %, graphene oxide ranging from about 0.1 weight % to 20 weight %, and silver ranging from about 2 weight % to 10 weight %, wherein the silver is formed on the titanium oxide. Accordingly, TiO$_2$-graphene-silver hybrid nanocomposite comprise essentially spherical particles with an average particle size of 12-15 nm. The tetragonal TiO$_2$ of the TiO2-graphene-silver hybrid nanocomposite predominantly exists in an anatase phase, silver predominantly in cubic phase and graphene oxide in characteristics phase.

Referring to FIG. 1b, a BET surface area analysis represented a surface area of 140.5 m$^2$/g for the TiO$_2$-graphene-Ag nanocomposite, significantly higher than the surface area observed for TiO$_2$ particles at 110.8 m$^2$/g. The increased surface area is characteristic of the synergistic effect of silver and graphene in combination, depicted by the mesopores of different pore sizes in the nitrogen physisorption measurements. Hereinafter, a method of preparing the TiO$_2$-graphene-silver hybrid nanocomposite will be further described.

To begin the method of preparation, pure sol of titanium oxide along with graphene containing sol is introduced to a microwave radiation of 50% microwave power, preferably at 2.45 GHz and irradiated for 18 minutes, to prepare a TiO$_2$-graphene oxide sample. The preparation of pure sol of titanium oxide along with graphene containing sol to initiate the preparation of the hybrid nano-composite includes a sol-gel synthesis process, wherein the sol-gel includes graphene added to the CTAB before adding TiCl$_4$, for example, thereby representing a combined sol-gel precursor. After irradiating the sample of $TiO_2$-graphene oxide, the method further includes washing the sample with ethanol and distilled water and is eventually dried for a period of 10 hours.

Accordingly, the method further includes suspending $TiO_2$-graphene oxide sample from the previous step, in deionized water at room temperature. A 0.5 M $AgNO_3$ solution is further added to the resulting suspension to prepare silver as an integral part of the resulting suspension. The amount of 0.5 M AgNO3 solution added to the resulting suspension, may vary, wherein the amount is selected from, 0.7, 1.77 and 3.55 ml to prepare 2%, 5% and 10% of silver respectively and thereby generate a $TiO_2$-graphene-silver hybrid suspension. The $TiO_2$-graphene-silver hybrid suspension undergoes reduction with 100 μl of hydrazine hydrate 80%, to be further irradiated with microwave irradiation preferably at an oscillation frequency of 2.45 GHz, for about 12-20 minutes. Thereafter, the irradiated $TiO_2$-graphene-silver hybrid suspension is washed with ethanol and distilled water and further dried at 80° C. overnight to generate dried and irradiated.

The dried irradiated $TiO_2$-graphene-silver hybrid further undergoes calcination by employing a furnace at 300° C. to produce $TiO_2$-graphene-silver hybrid nanocomposite wherein temperature is increased at a rate of 1° C./minute and maintained at such temperature for a time period of 3-5 hours.

In another embodiment, the sol gel synthesis of pure sol of titanium oxide along with graphene containing sol, as a combined sol, includes numerous steps. According to an example of the present embodiment, the sol gel synthesis includes preparing graphene oxide by a modified Hummer's method, wherein 4.5 g of graphite is added to 110 ml of 98% $H_2SO_4$ (95-98%, Basic) containing 2.5 g $NaNO_3$ 99.5%. The method further includes leaving the solution in an ice bath for a time period of 20 minutes at 0° C. followed by gradually introducing $KMnO_4$ to the solution, maintaining the temperature at 0° C. The resulting solution is left to stand at 40° C. for two hours with vigorous stirring, wherein the color of the solution turns to dark green. Furthermore, 230 ml of deionized water is added gradually to maintain the solution temperature below 50° C. An addition of 20 ml of $H_2O_2$ is made to the solution and maintained as such for a time period of 20 minutes. Thereafter, the solution is centrifuged at 4000 rpm repeatedly for a time period of 10 minutes, and further washed with 10% HCl and deionized water to render the solution acid/nitrate free and finally dried at 50° C. overnight to obtain a dry brown paste of graphene oxide.

Accordingly, sol-gel synthesis of $TiO_2$ includes adding $TiCl_4$ dropwise to 0.5 g of N-Cetyl-N,N,N-Trimethyl ammonium Bromide (CTAB) to generate a pale yellow precipitate, following which a suitable amount of 1.6 M $NH_4OH$ solution was prepared to further neutralize the acidic solution and eventually produce a pure $TiO_2$ sol. The pure $TiO_2$ sol is maintained at a temperature of 80° C. for 24 hours in a water bath to form a gel, to be further filtered and washed with absolute alcohol and distilled water. Thereafter, the gel is dried at a temperature of 80° C. for 10 hours in a drying oven.

Different samples containing different percentage of grapheme like 0.1%, 1%, 2%, 5%, 10% and 20%, require 0.019, 0.19, 0.038, 0.95, 1.9 and 3.8 g of graphene respectively to be added to the CTAB before addition of the $TiCl_4$, as outlined in the above steps, to prepare the combined sol for initiating microwave irradiation.

Figure 2:
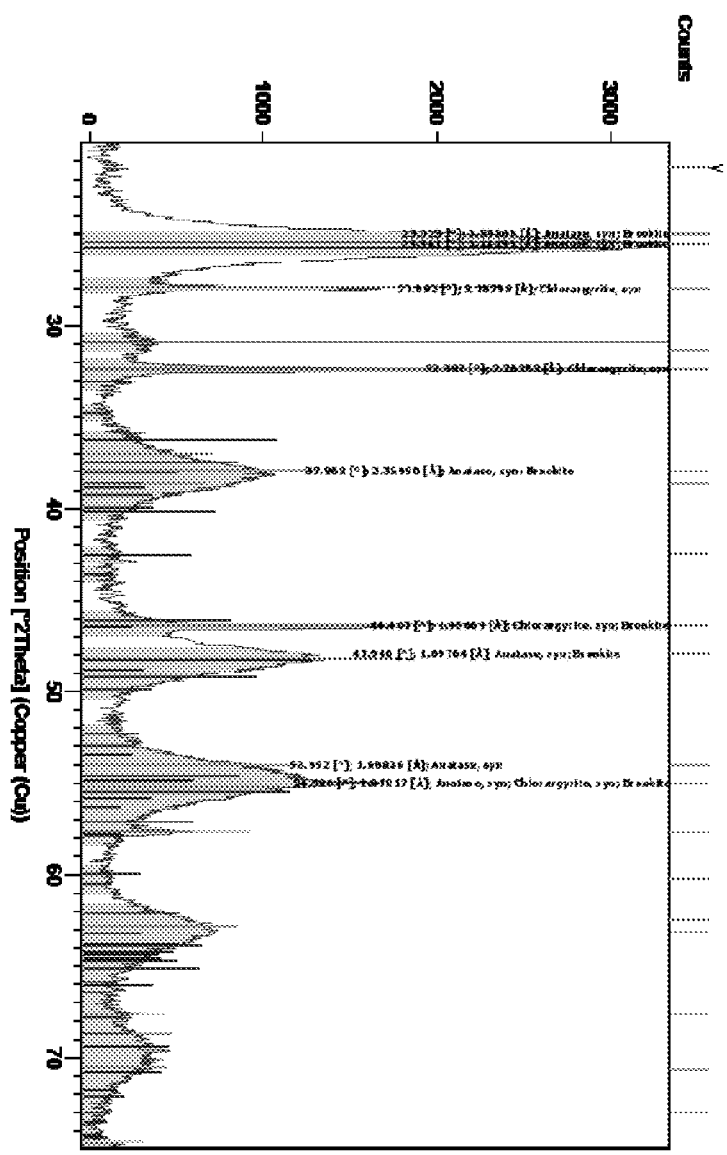
FIG. 2a is illustrative of XRD of TiO$_2$-graphene-silver prepared via the sol-gel synthesis technique followed by the microwave irradiation technique representing the anatase, and sliver phases, wherein the percentage weight of silver in the hybrid nanocomposite is 10%.
FIG. 2b is illustrative of the UV-vis absorption spectra of TiO$_2$-graphene-silver, wherein the percentage weight of silver in the hybrid nanocomposite is 10%.
FIG. 2c is illustrative of the SEM image of TiO$_2$-graphene-silver, wherein the percentage weight of silver in the hybrid nanocomposite is 10%.
FIG. 2d is illustrative of the photo degradation of methylene blue (MB) by the TiO$_2$-graphene-silver sample prepared by the microwave irradiation method, wherein the percentage weight of silver in the hybrid nanocomposite is 10%.
Figure 2:
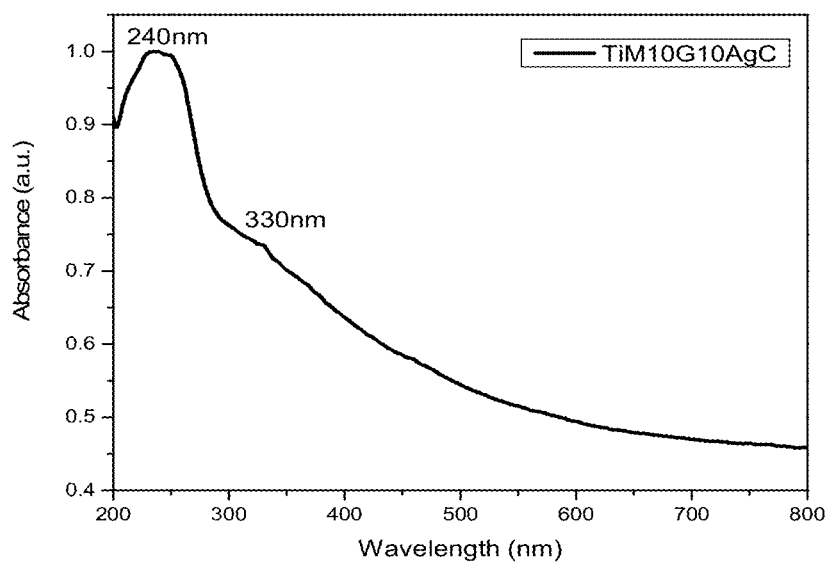
Figure 2:
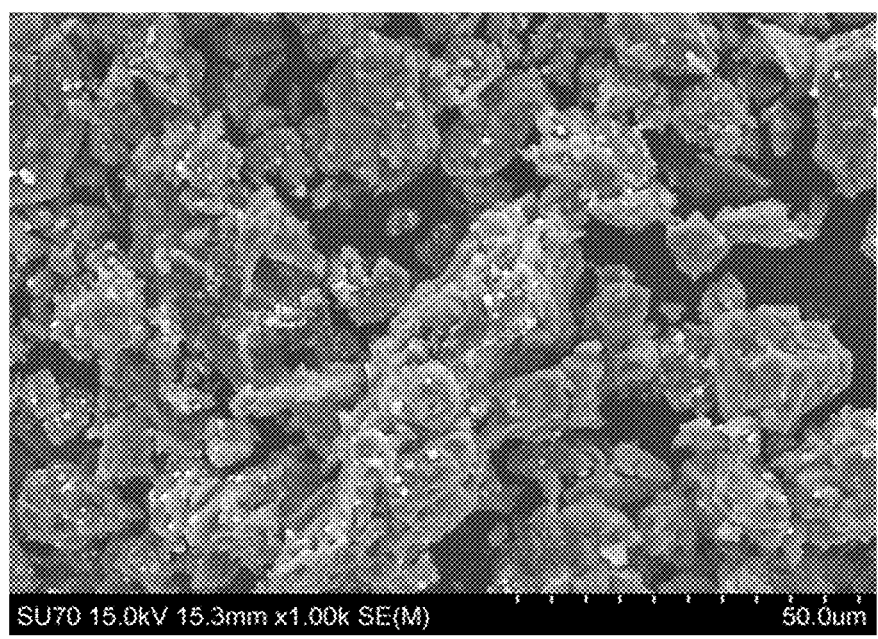
Figure 2D:
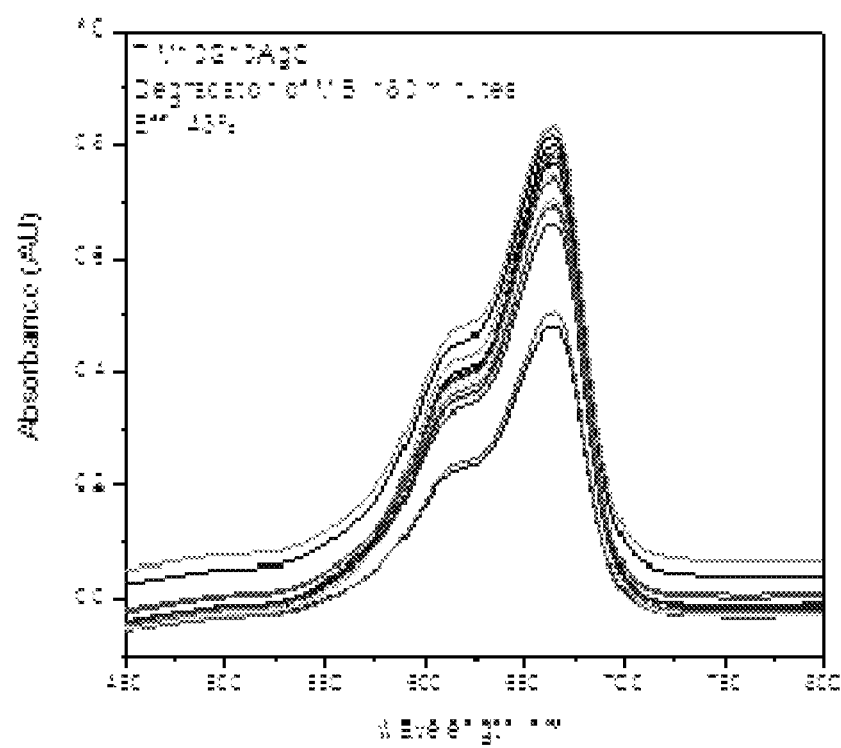

The method of preparation of $TiO_2$-graphene-Ag nanocomposites results in the formation of tetragonal $TiO_2$ predominantly in an anatase phase and silver predominantly in a cubic phase along with the characteristics phase of graphene oxide, wherein silver is about 10 weight %, as represented in FIG. 2a (XRD pattern). FIG. 2b is representative of the UV spectrum of the prepared $TiO_2$-graphene-Ag nanocomposites depicting the characteristic peak at 240 nm. Characterization studies represented by the SEM image as represented by FIG. 2c represents an average particle size of 12-15 nm. FIG. 2d includes photodegradation of methylene blue representing efficiency of 43% of the prepared $TiO_2$-graphene-silver nanocomposites over existing nanocomposites, the photodegradation occurring under the illumination of 254 nm (UV) for a duration of 180 minutes.

In another embodiment of the present invention, the $TiO_2$-graphene-silver hybrid nanocomposite is employed as an active material in a supercapacitor system, assembled in a two electrode system. Considering an example in accordance with the embodiment, wherein coin cells were assembled in a vacuum glove box of a supercapacitor, wherein the vacuum glove box is provided with an argon atmosphere. In line with the example, test coin cell comprises a metal cap, a metal case with polymer seal, a spring, two stainless steel collectors coated with active materials and a membrane separator accommodated in 1.2 M $LiPF_6$ in EC/DMC (1:1, v/v) was used as an electrolyte.

Capacitive behavior studies of supercapacitors were conducted, wherein the capacitive behavior studies include cyclic voltammetry (CV), galvanostatic charge/discharge, and Electrochemical impedance spectroscopy (EIS) test on an electrochemical workstation (GAMRY-3000, USA) at room temperature. Galvanostatically charged/discharged was performed at current density of 100 mA/g in a potential range of 0 to 2.8 V. CV was carried out at various scan rates in the range from 20 mV/s to 500 mV/s scan rate, while (EIS) analyses was performed by applying a perturbation voltage of 100 mV/s in a frequency range between 1 Hz and 100 kHz. The cycling stability for the supercapacitors was tested by using a continuous charge-discharge cycling at a current density of 100 mA/g.

Figure 3:
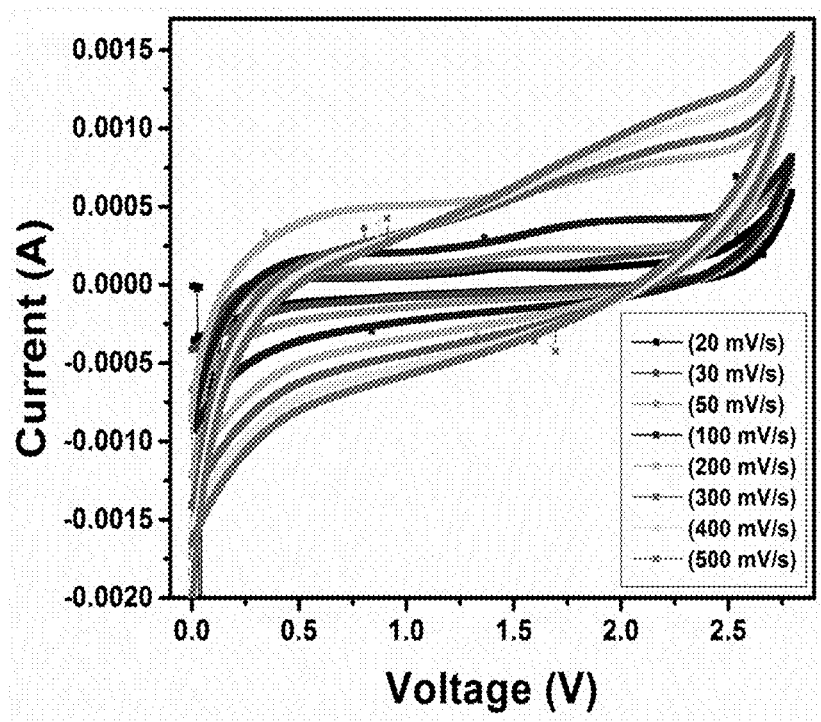
FIG. 3 is illustrative of cyclic voltammogram of TiO$_2$-graphene-silver nanocomposites at different scan rates ranging from 20 to 500 mV/s.

In reference to FIG. 3, $TiO_2$-graphene-silver nanocomposites of the present invention employed in energy storage applications, exhibits a quasi-rectangular shape, indicating an ideal capacitive behavior at different scan rates of 20, 30, 50, 100, 200, 300, 400 and 500 mV/s in the potential window of 0-2.8 V. Furthermore, referring to the linear increase of the current with increasing scan rate, it is indicated that the charge is primarily non-faradic in nature.

Figure 4:
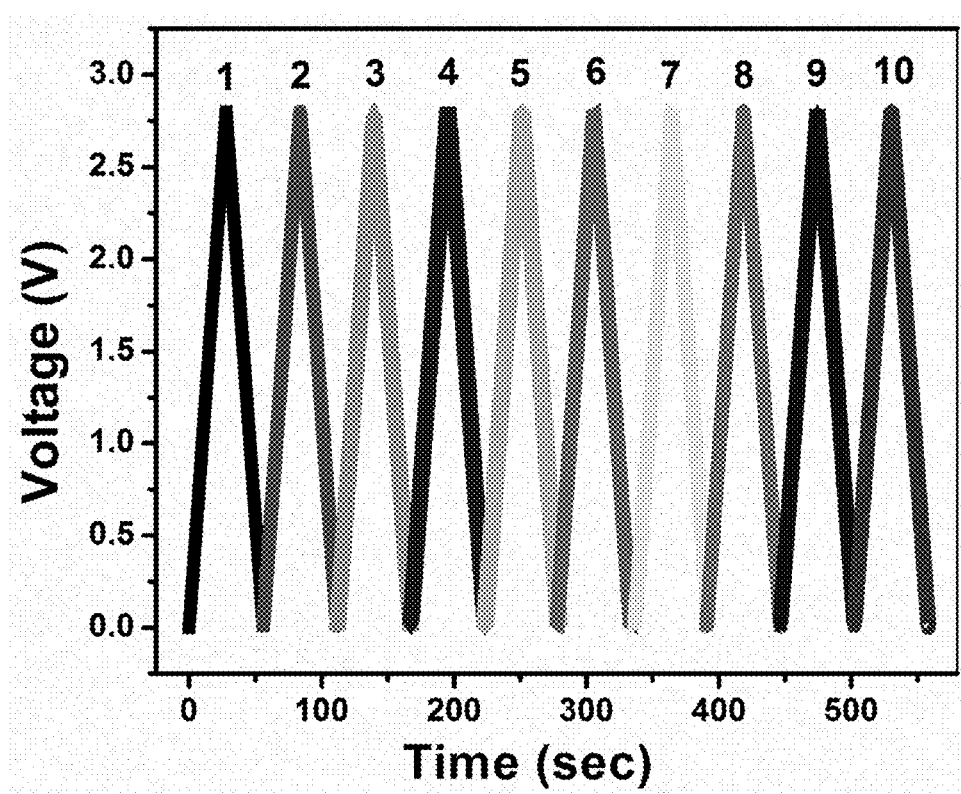
FIG. 4 is illustrative of the galvanostatic charge/discharge curve of TiO$_2$-graphene-silver nanocomposites at 100 mV/s, when the nanocomposite is employed in a supercapacitor.

In reference to FIG. 4, the galvanostatic charge/discharge curve of $TiO_2$-graphene-silver nanocomposites is represented at 100 mV/s, $TiO_2$-graphene-silver hybrid nanocomposite is employed as an active material in a supercapacitor system.

Figure 5:
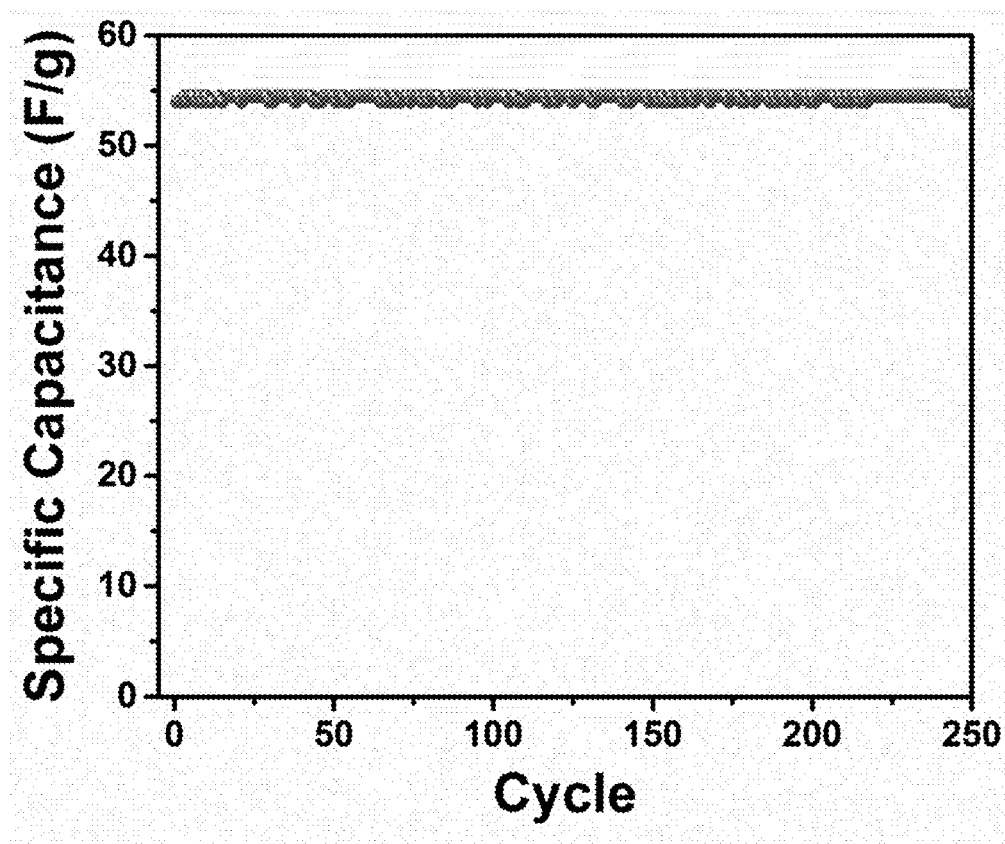
FIG. 5 is illustrative of the variation of the specific capacitance of TiO$_2$-graphene-silver nanocomposites electrode as a function of cycle number measured at 100 mV/s.

Now referring to FIG. 5, wherein variation of the specific capacitance of $TiO_2$-graphene-silver hybrid nanocomposites electrode as a function of cycle number measured at 100 mV/s is represented as long term cycle stability is a crucial parameter of to be studied with respect to supercapacitors. Advantageously, the present invention exhibits a very long cycle life over the entire cycle number, when evaluated by repeating the CV measurements between 0 and 2.8 V at a scan rate of 100 mV/s for 250 cycles as shown in FIG. 5. Furthermore, the specific capacitance as a function of cycle number is maintained a constant even after 250 cycles, indicative of a good cycling life of the electrode materials, wherein the electrode materials is made of the $TiO_2$-graphene-silver hybrid nanocomposites of the present invention. Furthermore, the specific capacitance (Cs), of the electrode is at a scan rate of 100 mV/s and current density of 100 mA/g is 54 F/g, almost 5 times higher than that of the $TiO_2$/Ti electrode (11.70 F/g), thereby representing excellent capacitance as opposed to the erstwhile supercapacitor.

Figure 6:
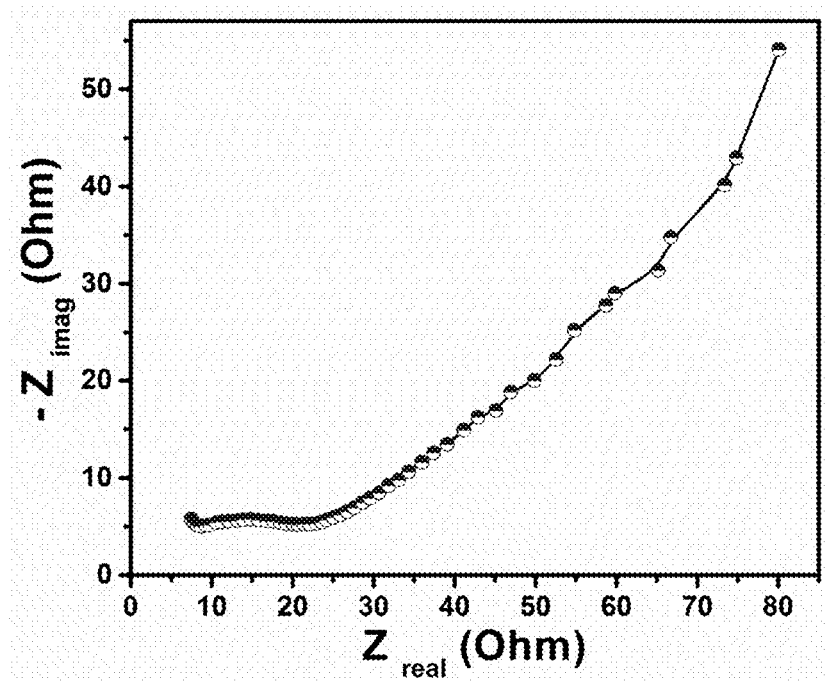
FIG. 6 is illustrative of electrochemical impedance spectra of TiO$_2$-graphene-silver nanocomposites from 100 kHz to 1 Hz in the form of Nyquist plots.

With reference to FIG. 6, EIS measurements were carried out at the open-circuit potential in the frequency range of 1-100 kHz with an AC perturbation of 100 mV to evaluate the fundamental capacitive behavior of electrode materials when employed in supercapacitor applications. The Nyquist plots of $TiO_2$-graphene-silver nanocomposites is a plot depicting the frequency response of the electrode material/electrolyte system against the imaginary component ($-Z''$ or $-Z_{imag}$) of the impedance against the real component ($Z'$ or $Z_{real}$). Again referring to FIG. 5, the impedance plot is composed of a semicircle arc in the high frequency region followed by a relative linear response in the low frequency region, wherein the high frequency region corresponds to the charge transfer limiting process. Also, the diameter of the semicircle corresponding to a resistance of 24 ohm, indicates that the charge transfer resistance of the $TiO_2$-graphene-silver nanocomposites is low and thereby more conductive. Furthermore, the linear part in the low frequency region is related to the Warburg resistance (diffusive resistance) of the electrolyte into the interior of the electrode surface and an ion diffusion/transport into the electrode surface. A line almost vertical to the real axis in the imaginary part of the impedance at the low-frequency region, represents the swift ion diffusion in electrolyte and the adsorption onto the electrode surface thereby facilitating an ideal capacitive behavior of the electrodes, whose active materials are composed of the $TiO_2$-graphene-silver nanocomposites of the present invention.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of preparing a $TiO_2$-graphene-silver hybrid nanocomposite, the method comprising:
   introducing sol gel to a microwave irradiation at 50% microwave power for a time period of 18 minutes to prepare an irradiated sample of $TiO_2$-graphene oxide sample, wherein the sol gel includes $TiO_2$ containing gel along with graphene containing sol;
   adding 0.5 M $AgNO_3$ solution to the $TiO_2$-graphene oxide sample for preparing a $TiO_2$-graphene-silver hybrid suspension;
   irradiating the $TiO_2$-graphene-silver hybrid suspension with microwave irradiation for a time period of 12 minutes to prepare irradiated $TiO_2$-graphene-silver hybrid suspension, wherein the irradiated $TiO_2$-graphene-silver hybrid suspension is dried at a temperature of 80° C. to prepare dried $TiO_2$-graphene-silver hybrid composite; and
   calcining the dried $TiO_2$-graphene-silver hybrid composite at a calcination temperature of 300° C. for a time period ranging from three to five hours to prepare the $TiO_2$-graphene-silver hybrid nanocomposite.

2. The method of claim 1, wherein preparing the $TiO_2$-graphene-silver hybrid suspension includes reducing the suspension with 100 µl of hydrazine hydrate.

3. The method of claim 1, wherein adding 0.5 M $AgNO_3$ solution to the $TiO_2$-graphene oxide sample includes selecting an amount of 0.5 M $AgNO_3$ from a group of 0.7, 1.77 and 3.55 ml.

4. The method of claim 1 further includes washing the irradiated $TiO_2$-graphene-silver hybrid suspension with ethanol followed by distilled water.

5. The method of claim 1, wherein calcining the dried $TiO_2$-graphene-silver hybrid composite includes increasing the calcination temperature at a rate of 1° C.-minute.

6. A $TiO_2$-graphene-silver hybrid nanocomposite comprising:
   titanium oxide ranging from about 70 weight % to 98 weight %;
   graphene oxide ranging from about 0.1 weight % to 20 weight %; and
   silver ranging from about 2 weight % to 10 weight %, wherein the silver is formed on the titanium oxide; and wherein average particle size of the $TiO_2$-graphene-silver hybrid nanocomposite is ranging from 12-15 nanometers.

7. The $TiO_2$-graphene-silver hybrid nanocomposite of claim 6, wherein the weight % of silver is selected from a group of 2%, 5% and 10%.

8. The $TiO_2$-graphene-silver hybrid nanocomposite of claim 6, wherein titanium oxide is predominantly in an anatase phase.

9. The $TiO_2$-graphene-silver hybrid nanocomposite of claim 6, wherein silver is predominantly in a cubic phase.

10. A $TiO_2$-graphene-silver hybrid nanocomposite of claim 6 is employed in supercapacitors, assembled in a two-electrode system.

* * * * *